(12) United States Patent
Venkataraman et al.

(10) Patent No.: US 7,895,218 B2
(45) Date of Patent: Feb. 22, 2011

(54) METHOD AND SYSTEM FOR PERFORMING SEARCHES FOR TELEVISION CONTENT USING REDUCED TEXT INPUT

(75) Inventors: Sashikumar Venkataraman, Bangalore (IN); Rakesh D. Barve, Bangalore (IN); Pranav Rajanala, Koppal (IN); Rahul Agrawal, Bhopal (IN); Murali Aravamudan, Windham, NH (US); Ajit Rajasekharan, West Windsor, NJ (US)

(73) Assignee: Veveo, Inc., Andover, MA (US)

( * ) Notice: Subject to any disclaimer, the term of this patent is extended or adjusted under 35 U.S.C. 154(b) by 938 days.

(21) Appl. No.: 11/136,261

(22) Filed: May 24, 2005

(65) Prior Publication Data
US 2006/0101503 A1 May 11, 2006

Related U.S. Application Data

(60) Provisional application No. 60/626,274, filed on Nov. 9, 2004, provisional application No. 60/664,879, filed on Mar. 24, 2005.

(51) Int. Cl.
*G06F 7/00* (2006.01)
*G06F 17/30* (2006.01)
(52) U.S. Cl. .................. 707/754; 707/736; 707/713; 707/706
(58) Field of Classification Search .................. 725/51, 725/53; 707/3, 754
See application file for complete search history.

(56) References Cited

U.S. PATENT DOCUMENTS
1,261,167 A 4/1918 Russell
(Continued)

FOREIGN PATENT DOCUMENTS
EP 1050794 11/2000
(Continued)

OTHER PUBLICATIONS

Mackenzie et al., Letterwise: Prefix-Based Disambiguation for Mobile Text Input, Proceedings of the ACM Symposium on User Interface Software and Technology—UIST 2001, pp. 111-120.
(Continued)

*Primary Examiner*—Apu M Mofiz
*Assistant Examiner*—Jared M Bibbee
(74) *Attorney, Agent, or Firm*—Wilmer Cutler Pickering Hale and Dorr LLP

(57) ABSTRACT

A method and system are provided for identifying a television content item desired by a television viewer from a set of television content items. Each of the television content items has one or more associated descriptors. The system receives from the television viewer a reduced text search entry directed at identifying the desired television content item. The search entry is a prefix substring of one or more words relating to the desired television content item. The system dynamically identifies a group of one or more television content items from the set of television content items having one or more descriptors matching the search entry as the television viewer enters each character of the search entry. The system then transmits the names of the one or more television content items of the identified group to be displayed on a device operated by the television viewer.

36 Claims, 8 Drawing Sheets

U.S. PATENT DOCUMENTS

| | | |
|---|---|---|
| 4,453,217 A | 6/1984 | Boivie |
| 4,760,528 A | 7/1988 | Levin |
| 4,797,855 A | 1/1989 | Duncan, IV et al. |
| 4,893,238 A | 1/1990 | Venema |
| 5,224,060 A | 6/1993 | Ma et al. |
| 5,337,347 A | 8/1994 | Halstead-Nussloch et al. |
| 5,369,605 A | 11/1994 | Parks |
| 5,487,616 A | 1/1996 | Ichbiah |
| 5,532,754 A | 7/1996 | Young et al. |
| 5,623,406 A | 4/1997 | Ichbiah |
| 5,635,989 A | 6/1997 | Rothmuller |
| 5,774,588 A | 6/1998 | Li |
| 5,805,155 A | 9/1998 | Allibhoy et al. |
| 5,818,437 A | 10/1998 | Grover et al. |
| 5,828,420 A | 10/1998 | Marshall et al. |
| 5,828,991 A | 10/1998 | Skiena et al. |
| 5,859,662 A | 1/1999 | Cragun et al. |
| 5,880,768 A | 3/1999 | Lemmons et al. |
| 5,912,664 A | 6/1999 | Eick et al. |
| 5,930,788 A | 7/1999 | Wical |
| 5,937,422 A | 8/1999 | Nelson et al. |
| 5,945,928 A | 8/1999 | Kushler et al. |
| 5,945,987 A | 8/1999 | Dunn |
| 5,953,541 A | 9/1999 | King et al. |
| 6,005,565 A | 12/1999 | Legall et al. |
| 6,005,597 A | 12/1999 | Barrett et al. |
| 6,006,225 A | 12/1999 | Bowman et al. |
| 6,009,459 A | 12/1999 | Belfiore et al. |
| 6,011,554 A | 1/2000 | King et al. |
| 6,047,300 A | 4/2000 | Walfish et al. |
| 6,075,526 A | 6/2000 | Rothmuller |
| 6,133,909 A | 10/2000 | Schein et al. |
| 6,184,877 B1 | 2/2001 | Dodson et al. |
| 6,189,002 B1 | 2/2001 | Roitblat |
| 6,223,059 B1 | 4/2001 | Haestrup et al. |
| 6,260,050 B1 | 7/2001 | Yost et al. |
| 6,266,048 B1 | 7/2001 | Carau, Sr. |
| 6,266,814 B1 | 7/2001 | Lemmons et al. |
| 6,269,361 B1 | 7/2001 | Davis et al. |
| 6,286,064 B1 | 9/2001 | King et al. |
| 6,307,548 B1 | 10/2001 | Flinchem et al. |
| 6,307,549 B1 | 10/2001 | King et al. |
| 6,360,215 B1 | 3/2002 | Judd et al. |
| 6,377,945 B1 | 4/2002 | Risvik et al. |
| 6,385,602 B1 | 5/2002 | Tso et al. |
| 6,438,751 B1 | 8/2002 | Voyticky et al. |
| 6,463,586 B1 | 10/2002 | Jerding |
| 6,466,933 B1 | 10/2002 | Huang et al. |
| 6,529,903 B2 | 3/2003 | Smith |
| 6,564,213 B1 | 5/2003 | Ortega et al. |
| 6,564,313 B1 | 5/2003 | Kashyap |
| 6,594,657 B1 | 7/2003 | Livowsky et al. |
| 6,600,496 B1 | 7/2003 | Wagner et al. |
| 6,614,455 B1 | 9/2003 | Cuijpers et al. |
| 6,615,248 B1 | 9/2003 | Smith |
| 6,664,980 B2 | 12/2003 | Bryan et al. |
| 6,721,954 B1 | 4/2004 | Nickum |
| 6,732,369 B1 | 5/2004 | Schein et al. |
| 6,757,906 B1 | 6/2004 | Look et al. |
| 6,766,526 B1 | 7/2004 | Ellis |
| 6,772,147 B2 | 8/2004 | Wang |
| 6,785,671 B1 | 8/2004 | Bailey et al. |
| 6,801,909 B2 | 10/2004 | Delgado et al. |
| 6,839,702 B1 | 1/2005 | Patel et al. |
| 6,839,705 B1 | 1/2005 | Grooters |
| 6,850,693 B2 | 2/2005 | Young et al. |
| 6,865,575 B1 | 3/2005 | Smith et al. |
| 6,865,746 B1 | 3/2005 | Herrington et al. |
| 6,907,273 B1 | 6/2005 | Smethers |
| 6,965,374 B2 | 11/2005 | Villet et al. |
| 6,999,959 B1 | 2/2006 | Lawrence et al. |
| 7,013,304 B1 | 3/2006 | Schuetze et al. |
| 7,117,207 B1 | 10/2006 | Kerschberg et al. |
| 7,136,845 B2 | 11/2006 | Chandrasekar et al. |
| 7,136,854 B2 | 11/2006 | Smith |
| 7,146,627 B1 | 12/2006 | Ismail et al. |
| 7,149,983 B1 | 12/2006 | Robertson et al. |
| 7,213,256 B1 | 5/2007 | Kikinis |
| 7,225,180 B2 | 5/2007 | Donaldson et al. |
| 7,225,184 B2 | 5/2007 | Carrasco et al. |
| 7,225,455 B2 | 5/2007 | Bennington et al. |
| 7,269,548 B2 | 9/2007 | Fux et al. |
| 7,293,231 B1 | 11/2007 | Gunn et al. |
| 7,461,061 B2 | 12/2008 | Aravamudan et al. |
| 7,509,313 B2 | 3/2009 | Colledge et al. |
| 7,529,744 B1 | 5/2009 | Srivastava et al. |
| 7,536,384 B2 | 5/2009 | Venkataraman et al. |
| 7,539,676 B2 | 5/2009 | Aravamudan et al. |
| 7,548,915 B2 | 6/2009 | Ramer et al. |
| 7,644,054 B2 | 1/2010 | Garg et al. |
| 7,657,526 B2 | 2/2010 | Aravamudan et al. |
| 7,779,011 B2 | 8/2010 | Venkataraman et al. |
| 7,788,266 B2 | 8/2010 | Venkataraman et al. |
| 2002/0002550 A1 | 1/2002 | Berman |
| 2002/0042791 A1 | 4/2002 | Smith et al. |
| 2002/0049752 A1 | 4/2002 | Bowman et al. |
| 2002/0052873 A1 | 5/2002 | Delgado et al. |
| 2002/0059621 A1 | 5/2002 | Thomas et al. |
| 2002/0077143 A1 | 6/2002 | Sharif et al. |
| 2002/0083448 A1 | 6/2002 | Johnson |
| 2002/0133481 A1* | 9/2002 | Smith et al. ................ 707/3 |
| 2002/0184373 A1 | 12/2002 | Maes |
| 2002/0188488 A1 | 12/2002 | Hinkle |
| 2002/0199194 A1 | 12/2002 | Ali |
| 2003/0005452 A1 | 1/2003 | Rodriguez |
| 2003/0005462 A1 | 1/2003 | Broadus et al. |
| 2003/0011573 A1 | 1/2003 | Villet et al. |
| 2003/0014753 A1* | 1/2003 | Beach et al. ................ 725/53 |
| 2003/0023976 A1 | 1/2003 | Kamen et al. |
| 2003/0033292 A1 | 2/2003 | Meisel et al. |
| 2003/0037043 A1 | 2/2003 | Chang et al. |
| 2003/0046698 A1 | 3/2003 | Kamen et al. |
| 2003/0066079 A1* | 4/2003 | Suga ........................ 725/52 |
| 2003/0084270 A1 | 5/2003 | Coon et al. |
| 2003/0103088 A1 | 6/2003 | Dresti et al. |
| 2003/0226146 A1 | 12/2003 | Thurston et al. |
| 2003/0237096 A1 | 12/2003 | Barrett et al. |
| 2004/0021691 A1 | 2/2004 | Dostie et al. |
| 2004/0046744 A1 | 3/2004 | Rafii et al. |
| 2004/0049783 A1 | 3/2004 | Lemmons et al. |
| 2004/0073926 A1 | 4/2004 | Nakamura et al. |
| 2004/0078815 A1 | 4/2004 | Lemmons et al. |
| 2004/0078816 A1 | 4/2004 | Johnson |
| 2004/0078820 A1 | 4/2004 | Nickum |
| 2004/0083198 A1 | 4/2004 | Bradford et al. |
| 2004/0093616 A1* | 5/2004 | Johnson ..................... 725/53 |
| 2004/0111745 A1 | 6/2004 | Schein et al. |
| 2004/0128686 A1* | 7/2004 | Boyer et al. ................ 725/51 |
| 2004/0139091 A1 | 7/2004 | Shin |
| 2004/0143569 A1 | 7/2004 | Gross et al. |
| 2004/0194141 A1* | 9/2004 | Sanders ..................... 725/53 |
| 2004/0216160 A1 | 10/2004 | Lemmons et al. |
| 2004/0220926 A1 | 11/2004 | Lamkin et al. |
| 2004/0221308 A1 | 11/2004 | Cuttner et al. |
| 2004/0261021 A1 | 12/2004 | Mittal et al. |
| 2005/0015366 A1 | 1/2005 | Carrasco et al. |
| 2005/0038702 A1 | 2/2005 | Merriman et al. |
| 2005/0071874 A1 | 3/2005 | Elcock et al. |
| 2005/0086234 A1 | 4/2005 | Tosey |
| 2005/0086691 A1 | 4/2005 | Dudkiewicz et al. |
| 2005/0086692 A1 | 4/2005 | Dudkiewicz et al. |
| 2005/0174333 A1 | 8/2005 | Robinson et al. |
| 2005/0192944 A1 | 9/2005 | Flinchem |
| 2005/0210020 A1 | 9/2005 | Gunn et al. |

| | | |
|---|---|---|
| 2005/0210383 A1 | 9/2005 | Cucerzan et al. |
| 2005/0210402 A1 | 9/2005 | Gunn et al. |
| 2005/0223308 A1 | 10/2005 | Gunn et al. |
| 2005/0240580 A1 | 10/2005 | Zamir et al. |
| 2005/0246311 A1 | 11/2005 | Whelan et al. |
| 2005/0246324 A1 | 11/2005 | Paalasmaa et al. |
| 2005/0278175 A1 | 12/2005 | Hyvonen |
| 2005/0283468 A1 | 12/2005 | Kamvar et al. |
| 2006/0010477 A1 | 1/2006 | Yu |
| 2006/0010503 A1 | 1/2006 | Inoue et al. |
| 2006/0013487 A1 | 1/2006 | Longe et al. |
| 2006/0015906 A1* | 1/2006 | Boyer et al. ........ 725/51 |
| 2006/0036640 A1 | 2/2006 | Tateno et al. |
| 2006/0059044 A1 | 3/2006 | Chan et al. |
| 2006/0069616 A1 | 3/2006 | Bau |
| 2006/0075429 A1 | 4/2006 | Istvan et al. |
| 2006/0090182 A1 | 4/2006 | Horowitz et al. |
| 2006/0090185 A1 | 4/2006 | Zito et al. |
| 2006/0101499 A1 | 5/2006 | Aravamudan et al. |
| 2006/0101503 A1 | 5/2006 | Venkataraman et al. |
| 2006/0101504 A1 | 5/2006 | Aravamudan et al. |
| 2006/0112162 A1 | 5/2006 | Marot et al. |
| 2006/0161520 A1 | 7/2006 | Brewer et al. |
| 2006/0163337 A1 | 7/2006 | Unruh |
| 2006/0167676 A1 | 7/2006 | Plumb |
| 2006/0167859 A1 | 7/2006 | Verbeck Sibley et al. |
| 2006/0190308 A1 | 8/2006 | Janssens et al. |
| 2006/0195435 A1 | 8/2006 | Laird-McConnell et al. |
| 2006/0206454 A1 | 9/2006 | Forstall et al. |
| 2006/0248078 A1 | 11/2006 | Gross et al. |
| 2006/0256078 A1 | 11/2006 | Flinchem et al. |
| 2006/0259479 A1 | 11/2006 | Dai |
| 2006/0274051 A1 | 12/2006 | Longe et al. |
| 2007/0005563 A1 | 1/2007 | Aravamudan |
| 2007/0016476 A1 | 1/2007 | Hoffberg et al. |
| 2007/0027852 A1 | 2/2007 | Howard et al. |
| 2007/0043750 A1 | 2/2007 | Dingle |
| 2007/0050337 A1 | 3/2007 | Venkataraman et al. |
| 2007/0050348 A1 | 3/2007 | Aharoni et al. |
| 2007/0061244 A1 | 3/2007 | Ramer et al. |
| 2007/0061317 A1 | 3/2007 | Ramer et al. |
| 2007/0061321 A1 | 3/2007 | Venkataraman |
| 2007/0061754 A1 | 3/2007 | Ardhanari et al. |
| 2007/0088681 A1 | 4/2007 | Aravamudan et al. |
| 2007/0130128 A1 | 6/2007 | Garg et al. |
| 2007/0143567 A1 | 6/2007 | Gorobets |
| 2007/0150606 A1 | 6/2007 | Flinchem et al. |
| 2007/0219984 A1 | 9/2007 | Aravamudan et al. |
| 2007/0219985 A1 | 9/2007 | Aravamudan et al. |
| 2007/0255693 A1 | 11/2007 | Ramaswamy et al. |
| 2007/0260703 A1 | 11/2007 | Ardhanari et al. |
| 2007/0266021 A1 | 11/2007 | Aravamudan et al. |
| 2007/0266026 A1 | 11/2007 | Aravamudan et al. |
| 2007/0266406 A1 | 11/2007 | Aravamudan et al. |
| 2007/0271205 A1 | 11/2007 | Aravamudan et al. |
| 2007/0276773 A1 | 11/2007 | Aravamudan et al. |
| 2007/0276821 A1 | 11/2007 | Aravamudan et al. |
| 2007/0276859 A1 | 11/2007 | Aravamudan et al. |
| 2007/0288456 A1 | 12/2007 | Aravamudan et al. |
| 2007/0288457 A1 | 12/2007 | Aravamudan et al. |
| 2008/0065617 A1 | 3/2008 | Burke et al. |
| 2008/0114743 A1 | 5/2008 | Venkataraman et al. |
| 2008/0177717 A1 | 7/2008 | Kumar et al. |
| 2008/0195601 A1 | 8/2008 | Ntoulas et al. |
| 2008/0313564 A1 | 12/2008 | Barve et al. |
| 2009/0077496 A1 | 3/2009 | Aravamudan et al. |
| 2009/0198688 A1 | 8/2009 | Venkataraman et al. |
| 2010/0121845 A1 | 5/2010 | Aravamudan et al. |
| 2010/0153380 A1 | 6/2010 | Garg et al. |

FOREIGN PATENT DOCUMENTS

| | | |
|---|---|---|
| EP | 1143691 | 10/2001 |
| EP | 1338976 | 8/2003 |
| EP | 1463307 A | 9/2004 |
| EP | 1622054 | 2/2006 |
| EP | 1810508 | 7/2007 |
| WO | WO-98/56173 | 12/1998 |
| WO | WO-0070505 | 11/2000 |
| WO | WO-2004/031931 A1 | 4/2004 |
| WO | WO-2004010326 | 11/2004 |
| WO | WO-2005/033967 A3 | 4/2005 |
| WO | WO-2005/084235 A2 | 9/2005 |
| WO | WO-2006/052959 | 5/2006 |
| WO | WO-2006/052966 | 5/2006 |
| WO | WO-2007/025148 | 3/2007 |
| WO | WO-2007/025149 | 3/2007 |
| WO | WO-2007/062035 | 5/2007 |
| WO | WO-2007/118038 | 10/2007 |
| WO | WO-2007/124429 | 11/2007 |
| WO | WO-2007/124436 A2 | 11/2007 |
| WO | WO-2007/131058 | 11/2007 |
| WO | WO-2008/034057 | 3/2008 |
| WO | WO-2008/091941 | 7/2008 |
| WO | WO-2008/148012 | 12/2008 |

OTHER PUBLICATIONS

Silfverberg et al., Predicting Text Entry Speed on Mobile Phones, Proceedings of the ACM Conference on Human Factors in Computing Systems—CHI 2000. pp. 9-16.

Press Release From Tegic Communications, Tegic Communications is Awarded Patent for Japanese T9(R) Text Input Software From the Japan Patent Office, Oct. 12, 2004. Retrieved Nov. 18, 2005 From HTTP://WWW.TEGIC.COM/PRESS_VIEW. HTML?RELEASE_NUM=55254242.

Gadd T.N., PHONIX: The Algorithm, Program 24(4), Oct. 1990, pp. 363-369.

Dalianis, Improving Search Engine Retrieval Using a Compound Splitter for Swedish, Abstract of Presentation at Nodalida 2005—15TH Nordic Conference on Computational Linguistics, Joensuu Finland, May 21-22, 2005. Retrieved Jan. 5, 2006 From HTTP://PHON.JOENSUU.FI/NODALIDA/ABSTRACTS/03. SHTML.

U.S. Appl. No. 11/855,661, Venkataraman et al.
U.S. Appl. No. 11/862,917, Aravamudan.
U.S. Appl. No. 11/939,086, Ramakrishnan et al.
U.S. Appl. No. 12/018,566, Venkataraman et al.

Ardissono, L. et al., User Modeling and Recommendation Techniques for Personalized Electronic Program Guides, Personalized Digital Television, Editors: Ardissono, et al., Kluwer Academic Press, 2004.

Digital Video Broadcasting, http://www.dvb.org (Oct. 12, 2007).

Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.

International Search Report, International Application No. PCT/US06/25249, mailed Jan. 29, 2008 (2 pages).

International Search Report, International Application No. PCT/US06/33204, mailed Sep. 21, 2007 (2 pages).

International Search Report, International Application No. PCT/US06/40005, mailed Jul. 3, 2007 (4 Pages).

International Search Report, International Application No. PCT/US07/65703, mailed Jan. 25, 2008 (2 pages).

International Search Report, International Application No. PCT/US07/67100, mailed Mar. 7, 2008 (2 pages).

Matthom, "Text Highlighting in Search Results", Jul. 22, 2005. Available at www.matthom.com/archive/2005/07/22/text-highlighting-in-search-results; retrieved Jun. 23, 2006. (4 pages).

Mokotoff, Soundexing and Genealogy, Available at http://www.avotaynu.com/soundex.html, retrieved Mar. 19, 2008, last updated Sep. 8, 2007 (6 pages).

Review of Personalization Technologies: Collaborative Filtering vs. ChoiceStream's Attributized Bayesian Choice Modeling, Technology Brief, ChoiceStream Technologies, Cambridge, MA.

Talbot, David. "Soul of a New Mobile Machine." *Technology Review: The Design Issue* May/Jun. 2007. (pp. 46-53).

Wikipedia's entry for Levenshtein distance (n.d.). Retrieved Nov. 15, 2006 from http://en.wikipedia.org/wiki/Levenshtein_distance.

Written Opinion of the International Searching Authority, International Application No. PCT/US06/25249, mailed Jan. 29, 2008 (4 pages).

Written Opinion of the International Searching Authority, International Application No. PCT/US06/33204, mailed Sep. 21, 2007 (3 pages).

Written Opinion of the International Searching Authority, International Application No. PCT/US06/40005, mailed Jul. 3, 2007 (4 pages).

Written Opinion of the International Searching Authority, International Application No. PCT/US07/65703, mailed Jan. 25, 2008 (4 pages).

Written Opinion of the International Searching Authority, International Application No. PCT/US07/67100, mailed Mar. 7, 2008 (3 pages).

Supplementary European Search Report dated Aug. 20, 2009 for PCT/US2005040424, 13 pages.

Supplementary European Search Report mailed Aug. 11, 2009 for PCT/US2005040415, 15 pages.

Nardi, et al., "Integrating Communication and Information Through Contact Map," Communications of the ACM, vol. 45, No. 4, Apr. 2002, 7 pages, retrieved from URL:http://portal.acm.org/citation.cfm?id+505251>.

Supplemental European Search Report for EP 06838179.7 dated Dec. 9, 2009, 7 pages.

Supplemental European Search Report for EP07761026.9 dated Jan. 28, 2010, 8 pages.

Turski, et al., "Inner Circle—People Centered Email Client," CHI 2005 Conference on Human Factors in Computing Systems, Apr. 2005, pp. 1845-1848, 4 pages, retrieved from URL:http://portal.acm.org/citation.fcm?id+1056808.1057037.

International Search Report and Written Opinion of the International Searching Authority of the United States Patent and Trademark Office for PCT/US2006/033257, dated Mar. 26, 2008, 5 pages.

International Search Report and Written Opinion of the International Searching Authority of the United States Patent and Trademark Office for PCT/US2006/045053, dated Jul. 24, 2008, 8 pages.

International Search Report and Written Opinion of the International Searching Authority of the United States Patent and Trademark Office for PCT/US2006/33258, dated Mar. 26, 2008, 5 pages.

International Search Report and Written Opinion of the International Searching Authority of the United States Patent and Trademark Office for PCT/US2007/067114, dated Jul 2, 2008, 4 pages.

International Search Report and Written Opinion of the International Searching Authority of the United States Patent and Trademark Office for PCT/US2007/068064, 9 pages.

International Search Report and Written Opinion of the International Searching Authority of the United States Patent and Trademark Office for PCT/US2007/078490, 4 pages.

International Search Report and Written Opinion of the International Searching Authority of the United States Patent and Trademark Office for PCT/US2008/051789, dated Jul. 14, 2008, 5 pages.

International Search Report and Written Opinion of the International Searching Authority of the United States Patent and Trademark Office for PCT/US2008/064730, dated Sep. 8, 2008, 5 pages.

International Search Report and Written Opinion of the International Searching Authority, the United States Patent and Trademark Office, for PCT/US2005/40424, mailing date of Nov. 21, 2006, 6 pages.

Roe, et al., "Mapping UML Models Incorporating OCL Constraints into Object-Z," Technical Report, Sep. 2003, Department of Computing, Imperial College London, retrieved on Jul. 12, 2007, retrieved from the internet: <URL: http://www.doc.ic.ac.uk/-ar3/TechnicalReport2003_9.pdf>, 17 pages.

Supplementary European Search Report and Written Opinion for EP07842499, dated Aug. 25, 2010, 6 pages.

Supplementary European Search Report dated Aug. 20, 2009 for PCT/US2005/040424, 13 pages.

\* cited by examiner

NameSpace 301 = { Name$_1$, Name$_2$, Name$_3$,... Name$_N$};

Name 302 = { Word$_1$, Word$_2$, Word$_3$,... Word$_N$}

Examples: 303
"Casablanca" - one-word name instance from an ordered name space (movies)
"Malkovich" - one-word name instance from an unordered name space(cast names)
"Guns of Navarone" - three-word name instance from an ordered name space (movie)
"John Doe" - two-word name instance from an unordered name space (phone book)

FIG. 3

METHOD AND SYSTEM FOR PERFORMING SEARCHES FOR TELEVISION CONTENT USING REDUCED TEXT INPUT

RELATED APPLICATIONS

The present application is based on and claims priority from the following two U.S. provisional patent applications, the specifications of which are each incorporated herein in their entirety: (1) Ser. No. 60/626,274 filed on Nov. 9, 2004 and entitled "Television Systems and Associated Methods," and (2) Ser. No. 60/664,879 filed on Mar. 24, 2005 and entitled "Method and System for Performing Searches for Television Programming Using Reduced Text Input."

BACKGROUND OF THE INVENTION

1. Field of Invention

The present invention generally relates to a method and system for performing searches for television content and, more particularly, to a method and system for performing searches with text entry by a user reduced to prefix substrings representing elements of a namespace containing a set of names composed of one or more words that are either ordered or unordered.

2. Description of Related Art

Search engines have become increasingly important for finding needed information on the Internet using Personal Computers (PCs). While performing searches is predominantly a PC based activity to date, searching has begun percolating to non-PC domains such as televisions and hand-held devices, as content choices for these domains proliferate. Text input continues to be the primary input technique for search engines since speech input and other input technologies have not sufficiently matured. Though progress has been made recently for PCs with full QWERTY keyboards to reduce the amount of text input needed to arrive at a desired result, the search input process is still grossly deficient and cumbersome when it comes to searching for desired information or content on a large ten-foot interface television environment or a hand-held device. In these usage scenarios, the text input is ordinarily made using keys that are typically overloaded with multiple characters. Of the various device interactions (key stroke, scroll, selection etc.) during a search process in these non-PC systems, text input remains a dominant factor in determining the usability of search. This usability criterion typically constrains text input to a single keyword (such as a name) or a few keywords to describe the item that is being searched. Rich text input such as "natural language input" is generally precluded in the non-PC systems not by the limitations of search engines, but by the difficulty of entering text.

A useful usage scenario for searching in these limited input capability environments could be to find information on a keyword a user has in mind, where the keyword could be the name of a person, place, object, media entity etc. Examples of such a search could be finding the movie "Guns of Navarone" (which as further described below can be considered a three-word name instance from an ordered name space), and "John Doe" (a two-word name instance from an unordered name space). An interesting property of certain search domains is that the percentage of names in the search domain with two or more words is quite significant. For instance, in the case of searching for a person's name (e.g., John Doe) in a phone database, the search domain name size (number of words constituting a name—2 in the case of John Doe) is at least two. In the movie space, a random sampling of 150,000 English movie titles revealed that 86% of the titles have name size greater than or equal to two, even with the removal of some of the most frequently occurring "article stop words" such as "a", "an", and "the."

It would be desirable for search engines for devices (with limited input capabilities in particular) to enable user to get to desired results with reduced input representing a namespace. In particular, a search method or system able to perform one or more of the following would be desirable:

(1) Captures information from one or more words making up a name, using a reduced number of characters to represent the original name. The number of results matched for the name entry is preferably limited to a given threshold, which can, e.g., be determined by the display space for rendering the results and the ease of scrolling through the results.

(2) Allows users to enter words in the namespace in any order. For example, a person lookup search such as "John Doe" should be possible either as "John Doe or Doe John." In this example, "John" and "Doe" is a two-word instance of a name from an unordered namespace.

(3) Facilitates learning of an efficient usage of the reduced text entry scheme intuitively and gradually. First time users should preferably be able to even enter the full string if they choose to. The system preferably provides users with cues and assistance to help learn to key in the reduced string to get to desired results.

(4) Works across search domains with diverse attributes such as (a) size of the search domain (b) the language used for search, (c) the clustering characteristics of names in the search domain, (d) the interface capabilities of the device used for search, and (e) computational power, memory, and bandwidth availability of the search system.

BRIEF SUMMARY OF EMBODIMENTS OF THE INVENTION

In accordance with one or more embodiments of the invention, a method and system are provided for identifying a television content item desired by a television viewer from a set of television content items. Each of the television content items has one or more associated descriptors. The system receives from the television viewer a reduced text search entry directed at identifying the desired television content item. The search entry is a prefix substring of one or more words relating to the desired television content item. The system dynamically identifies a group of one or more television content items from the set of television content items having one or more descriptors matching the search entry as the television viewer enters each character of the search entry. The system then transmits the names of the identified group of one or more television content items to be displayed on a device operated by the television viewer.

These and other features will become readily apparent from the following detailed description wherein embodiments of the invention are shown and described by way of illustration. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a more complete understanding of various embodiments of the present invention, reference is now made to the following descriptions taken in connection with the accompanying drawings in which:

FIG. 3 illustrates examples of a discrete structural composition of text input to a search system in accordance with one or more embodiments of the invention.

In the figures, like reference numerals refer to generally like elements.

DETAILED DESCRIPTION OF PREFERRED EMBODIMENTS

Figure 1:
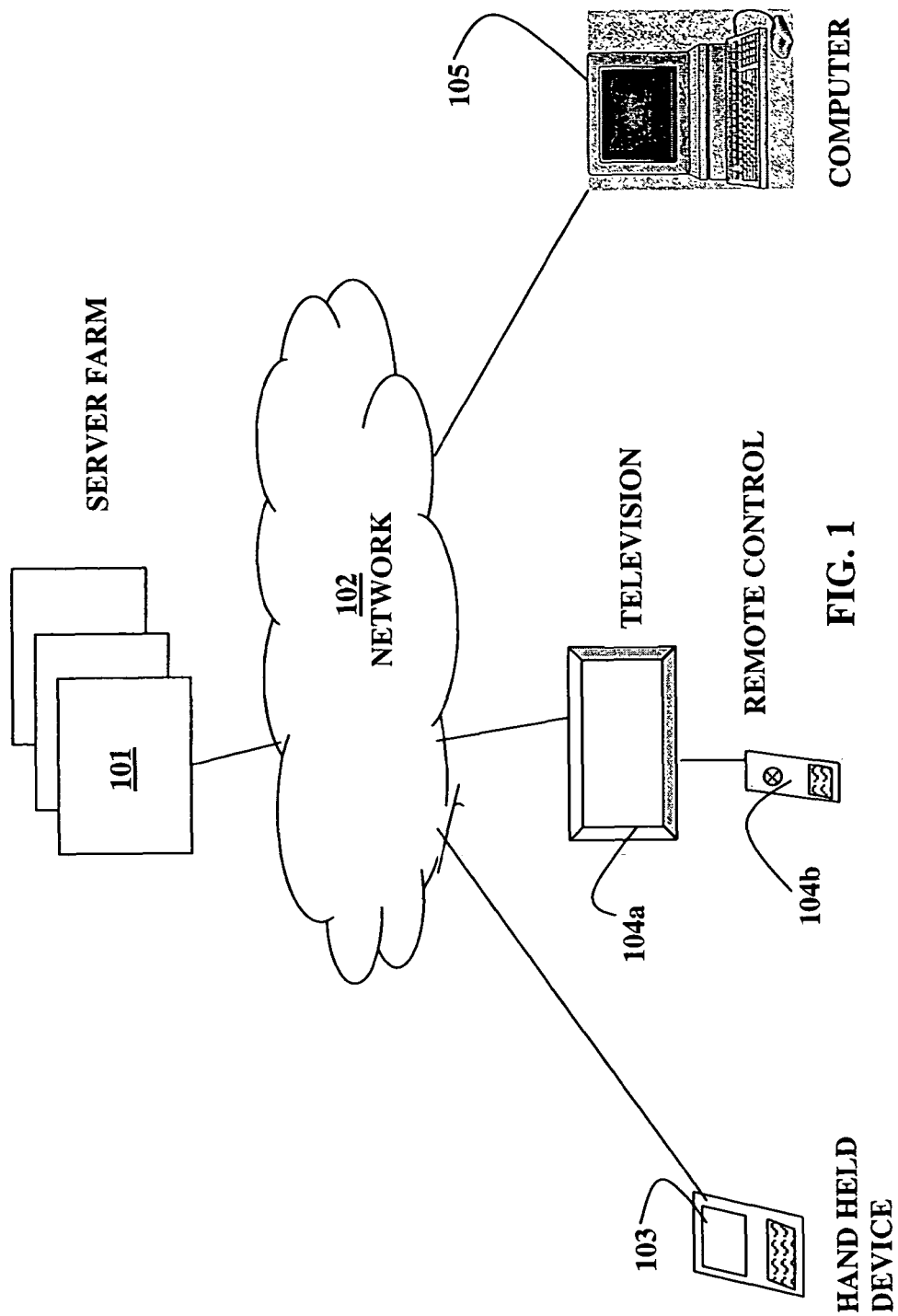
FIG. 1 illustrates a reduced text entry search system in accordance with one or more embodiments of the invention being used in different device and network configurations.

Briefly, as will be described in further detail below, in accordance with more embodiments of the invention, methods and systems are provided for identifying a television content item desired by a television viewer from a set of available television content items. Such television content items can include a wide variety of video/audio content including, but not limited to, television programs, movies, music videos, video-on-demand, or any other identifiable content that can be selected by a television viewer.

The television viewer can enter into a search device having a text input interface a reduced text search entry directed at identifying the desired television content item. The text can be one or more characters, which can be any alphanumeric character, symbol, space or character separator that can be entered by the user. Each television content item has one or more associated descriptors, particularly names in a namespace relating to the desired television content item. The descriptors specify information about the content, which can include, e.g., information on titles, cast, directors, descriptions, and key words. The names are composed of one or more words that can be either ordered or unordered. The user's search entry comprises one or more prefix substrings that represent a name or names in the namespace. A prefix substring of a word in a name captures information from the word and can be a variable length string that contains fewer than all the characters making up the word.

The system identifies a group of one or more television content items from the set of available television content items having descriptors matching the search entry. The names of the identified group of one or more television content items is then transmitted to and displayed on a device operated by the television viewer. The viewer can then select the desired content item from the group displayed, or enter further characters or edit the substring to narrow or change the results as desired.

The descriptors can include a preferably partial subset of pre-indexed prefix substring combinations. The prefix substrings entered by a user are input to an algorithm that can dynamically generate results leveraging off the pre-indexed prefix substring combinations. The size of the pre-indexed prefix substring combinations can be based on some balance between computational power, memory availability, and optionally bandwidth constraints of the system in which reduced text entry search is deployed.

The variable prefix substring search algorithm can allow multiple names to be entered, preferably without regard to the order. The results list for search is preferably dynamically culled by the text input of each character. The results are preferably ordered based on a relevance function that can be a domain specific combination of, e.g., popularity, temporal relevance, location relevance, personal preferences, and the number of words in the input search string.

One or more embodiments of the present invention also includes a system for intuitively informing and educating the user of the smallest or generally smallest substring for yielding a particular result, thereby empowering the user with a user-friendly search method particularly on platforms with limited text entry capabilities. The flexibility of entering prefix substrings of variable sizes to get to the desired result makes the reduced text entry scheme intuitive and easy to use.

FIG. 1 illustrates an overall system for performing searches with reduced text entry using a wide range of devices in accordance with one or more embodiments of the invention. A server farm 101 can serve as the source of search data and relevance updates with a network 102 functioning as the distribution framework. The distribution framework could be a combination of wired and wireless connections. Examples of possible networks include cable television networks, satellite television networks, and IP-based television networks. The search devices could have a wide range of interface capabilities such as a hand-held device 103 (e.g., a phone or PDA) with limited display size and overloaded or small QWERTY or other keypad, a television 104a coupled with a remote control device 104b having an overloaded or small QWERTY or other keypad, and a Personal Computer (PC) 105 with a full QWERTY or other keyboard and a computer display.

Figure 2:
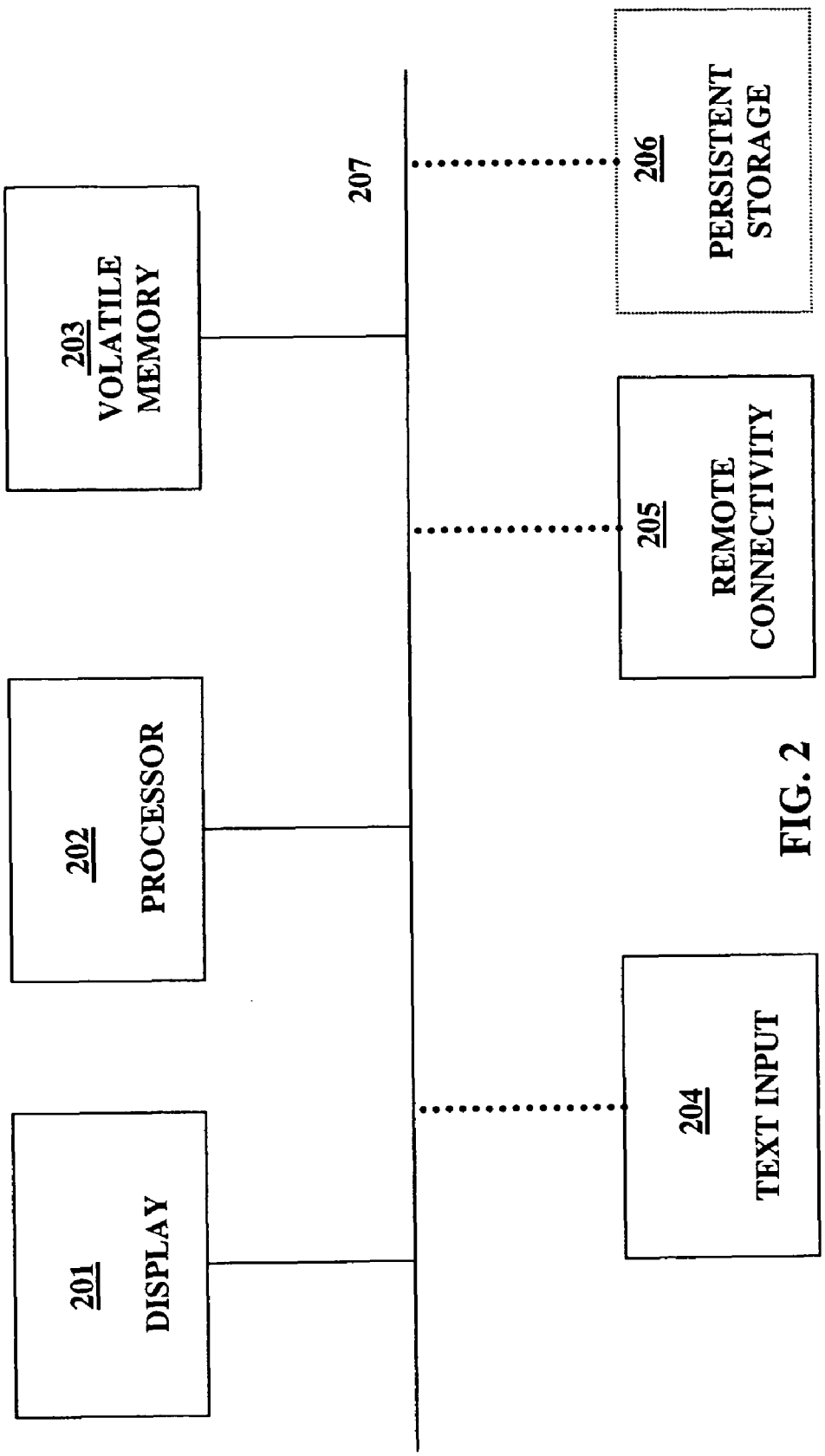
FIG. 2 illustrates configuration options of exemplary devices for performing searches in accordance with one or more embodiments of the invention.

FIG. 2 illustrates multiple exemplary configurations for search devices in accordance with one or more embodiments of the invention. In one configuration, a search device (e.g., PC 105) can have a display 201, a processor 202, volatile memory 203, text input interface 204 (which can be on-device or through a wireless remote control 104b), remote connectivity 205 to the server 101 through the network 102, and a persistent storage 206. A device configuration for a device such as the hand-held device 103 might not include local persistent storage 206. In this case, the device 103 could have remote connectivity 205 to submit the query to the server 101 and retrieve results from it. Another configuration of the device 103 may not have remote connectivity 205. In this case, the search database may be locally resident on a local persistent storage 206. The persistent storage 206 may be, e.g., a removable storage element too such as SD, SmartMedia, CompactFlash card etc. In a configuration of the device with remote connectivity 205 and persistent storage 206 for search (e.g., television 104*a*), the device may use the remote connectivity for search relevance data update or for the case where the search database is distributed on the local storage 206 and on the server 101. In one or more exemplary embodiments of the invention, a television 104*a* may have a set-top box with a one-way link to a satellite network. In this configuration, all search data including relevance updates may be downloaded to the device through a satellite link to perform local searching.

FIG. 3 illustrates an exemplary structure of a reduced text entry query for search in accordance with one or more embodiments of the invention. Each query can be composed of one or more words preferably delimited by a separator such as, e.g., a space character or a symbol. Adjacent words of the query may constitute an ordered name, e.g., "Guns of Navarone" or an unordered name, e.g., "John Doe" as illustrated in example 303. Individual words can also be part of a set of ordered or unordered names such as "Malkovich" or "Casablanca," though the ordering attribute is irrelevant in this case. A set of names that is either ordered or unordered constitutes a namespace. An example of an unordered namespace is a phone book with names of people. An example of an ordered namespace is a database of movie titles.

Figure 4:
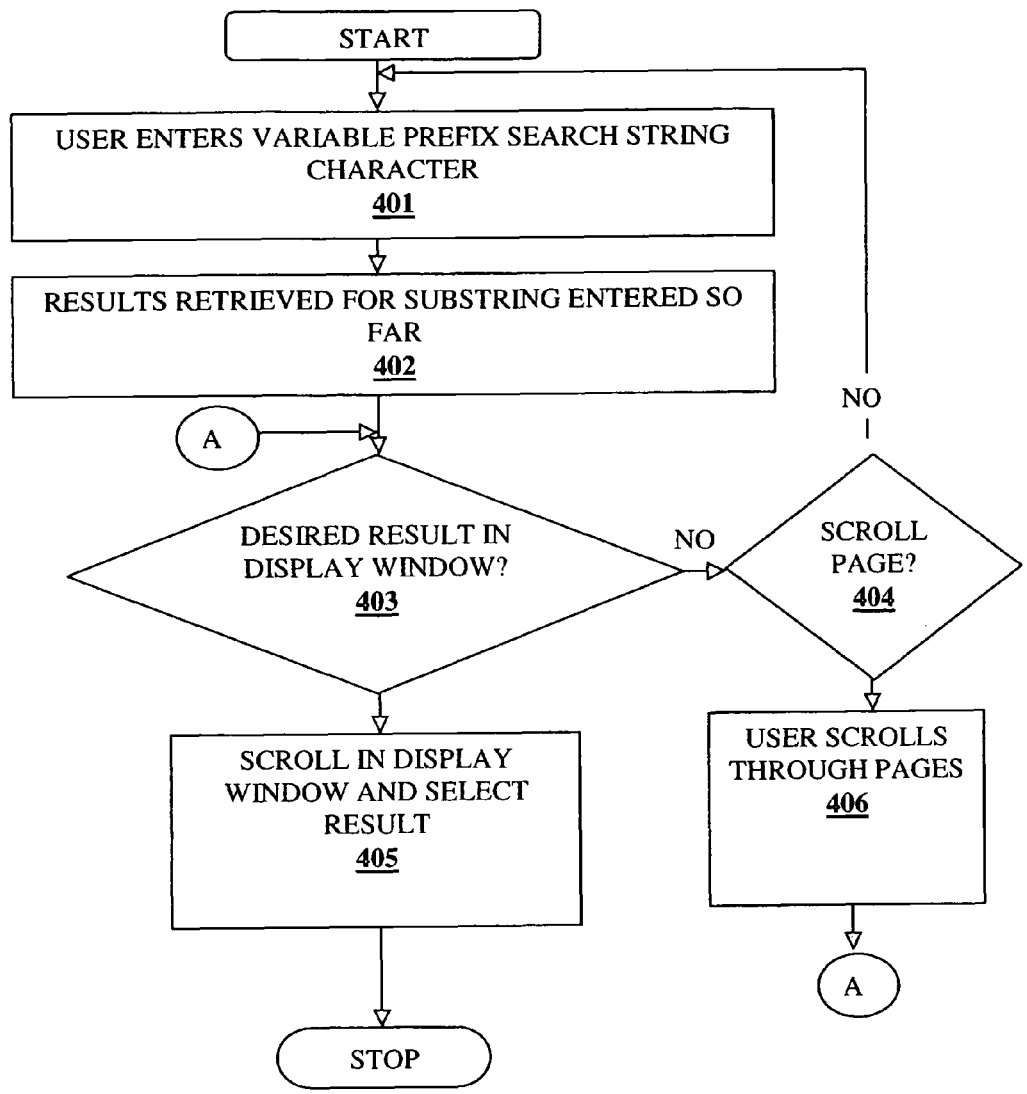
FIG. 4 illustrates a process of user starting a new search and entering text and arriving at a desired result in accordance with one or more embodiments of the invention.

FIG. 4 illustrates an exemplary process of user starting a new search, entering characters and arriving at the desired result in accordance with one or more embodiments of the invention. A user enters one or more search string characters at 401, which could be a variable size prefix of the intended query (e.g., to represent 'Brad Pitt', the user can enter B P, BR P, B PI etc.). Results are then preferably dynamically retrieved for the cumulative substring of characters entered up to that point at 402 and displayed. The user determines at 403 as to whether the desired result is shown in a display window. If the result is displayed in the display window, the user can scroll to the desired result within the display window and select the desired result at 405. If the desired result is the first entry in the display window 405, it can be selected by default obviating the need to scroll through the display window.

The ordering of results in the display window is preferably governed by a relevance function that is a domain specific combination of, e.g., popularity, temporal and location relevance. For example when a user is searching for a restaurant using a phone or Personal Digital Assistant (PDA) with GPS capabilities, then the listings could be ordered in descending order of the most popular restaurants in that area. If the user entered NBA, then the system could list the games in order of temporal relevance such as those in progress or are scheduled to begin in the near future are listed first.

If the desired result is not in the display window at step 403, the user can decide whether or not to scroll through pages of results not currently displayed in the window at 404. If the user decides to scroll through the pages, he or she can scroll down the display window linearly or page by page at 406 to reveal more results. If user does not want to scroll through pages, he or she can enter additional characters at 401 to narrow the results.

In the scenario where user does not reach the result due to misspelling or due to the case of a word whose uniqueness (e.g., Tom Brown, Todd Brown) is embedded in the suffix of a word in the query (as opposed to the prefix), the user would have to either go back to the first word and enter more characters or erase one or more of the typed characters and re-enter characters to reach the desired result. The dynamic update of results for each character entry enables the user to recover from an error during the text entry process itself, in contrast to discovering that no results match after typing the entire text.

Figure 5:
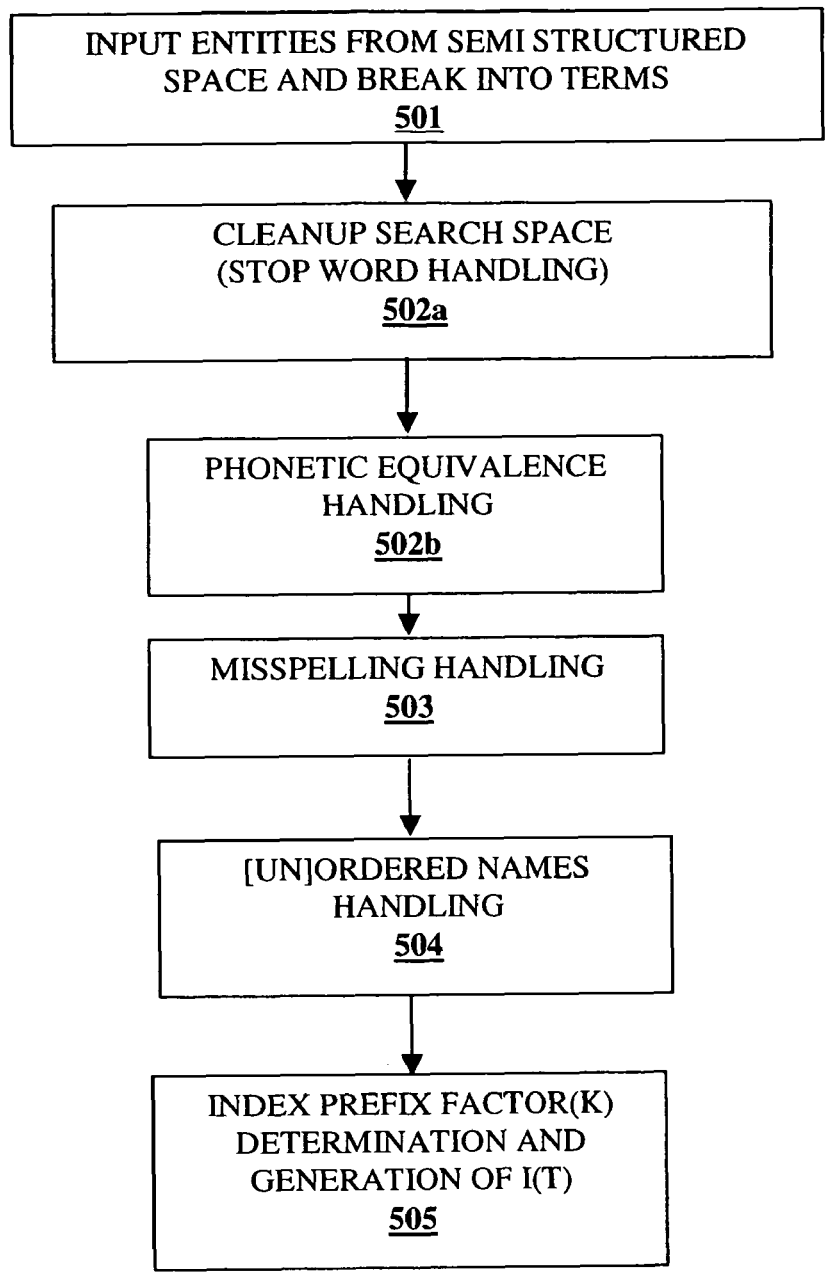
FIG. 5 illustrates a preprocessing step on a search space prior to indexing it in accordance with one or more embodiments of the invention.

FIG. 5 illustrates various steps in a pre-processing phase in accordance with one or more embodiments of the invention. As illustrated in FIG. 3, the input to this phase can be a semi-structured space of any size composed of entities or descriptors (e.g., titles, cast, directors, description, key words) with their metadata values. This semi-structured search space can have a wide range of sizes, e.g., from the size of a PDA phone book to a large subspace obtained by a focused web crawl followed by relevant text processing to derive entities. In scenarios where the search space size is large, it can be possible to organize the space into smaller sub-spaces based on a categorization scheme. The first step 501 is the breakup of entities into terms (e.g., Tom Hanks, Secret Discoveries in Ancient China). A term is a set of ordered or unordered words. In accordance with one or more embodiments of the invention, multiple permutations of the words in the entity may be considered as candidate terms (e.g., Secret Discoveries of Ancient China, Discoveries of Ancient China, Ancient China, China). This allows searching a given entity using variable prefixes of any of the candidate terms. The second step is the cleanup of the entity space at 502*a*. The cleanup phase involves finding the locations of stop words such as "a", "an", "the". In the next step at 502*b*, entity names can be duplicated for phonetic equivalence handling (e.g., Jeff and Geoff). The duplication may be either implemented by actually creating multiple variants in data, or tagging for future algorithmic equivalence determination. A misspelling handling step 503 can address typical misspellings committed while entering text. An unordered names handling step 504 can first identify all the ordered and unordered names in a namespace, and then duplicate the unordered names (e.g., John Doe, Doe John). Duplication can involve either data duplication or tagging for algorithmic determination. The steps 501 through 504 determine a set of candidate terms T for each entity. A record is any particular prefix string of a term in T. For example, for the term "guns of navarone", "g o navarone" and "gu of navarone" are two of the many possible records. The set of all possible records of the terms in T is denoted by P(T), and searching for the given item could potentially be accomplished by using any of the prefix in this set.

At step 505, the number of variable prefix strings I(T) that will be pre-computed and stored in the index is determined. In many situations, it is not practical to pre-compute and store all the possible prefixes for all the terms due to expensive memory requirements. One or more embodiments of the present invention accordingly use a flexible method to store only a subset of P(T) based on different parameters such as available memory, computational power, and in some usage scenarios—bandwidth.

While computing I(T), there are a number of terms that are meant to recall entity names. Denote any such term 'T' of length N>=1 as $T = W_{1\_} W_{2\_} W_{3\_} \ldots W_N$ where $W_i$ denotes the $i^{th}$ word and '_' denotes a space (which is an example of a word delimiter)

For any integer 'k', let $W^k$ denote the k-character prefix of word W. If k is greater than length of word W, $W^k = W$. Let W(K) denote the set of words $W^k$ for $1 <= k <= K$, where K denotes the upper bound of the size of the prefix. For example, for the word "guns", W(2) consists of prefixes "g" and "gu". For any term T, its corresponding indexed set of I(T, K, C) of bounded multi-word prefix strings can be defined as follows $$I(T, K, C) = \{X_{1\_} X_{2\_} X_{3\_} X_{4\_} X_{5\_} \ldots X_{C\_} W_{C+1\_} \ldots W_N\}$$

Where $X_i \in W_i(K)$ and $W_i$ is the $i^{th}$ word in the term T, and where C denotes the number of words for which prefixes are pre-computed. In a preferred embodiment of the invention, the set I(T, K, C) (also denoted by I(T)) is the set of strings pre-computed on account of term T and tunable parameters K and C. The set I(T) represents the pre-computed records corresponding to the terms in T and is usually a proper subset of P(T). The computation method indexes only the set I(T) as a part of the pre-computation, though the user could input any string in P(T) (which possibly may not belong to I(T)) to efficiently retrieve the term T. This is done by performing some appropriate computation at runtime during the search process leveraging of the set I(T).

The special case of I(T, ∞, ∞) (i.e., K=∞ and C=∞) is the scenario where each record is pre-computed for all the terms in T. In this case I(T)=P(T). It may be impractical to implement this case since the memory requirements would be high even for search spaces of modest size. The case K=0 and C=0, is the scenario where no records are pre-computed, and the search for any term is done dynamically by lookup of all possible terms matching the prefix query. In such a scenario, the runtime costs could be high due to a complete lookup during the search process especially for small prefixes that match with a large number of terms. A practical implementation would choose a value of K and C that is a balance between available memory, computational power and in some usage scenarios bandwidth. For example, a practical implementation may choose K=2 and C=1. In this case for a term "guns of navarone", the pre-computed prefix strings (or records) would be "g_ of navarone, gu_ of navarone" in addition, to the term "guns of navarone" itself. Though I(T) would in most practical implementations be a proper subset of P(T), the system would dynamically match terms that are not in I(T) (such as gun o nav) leveraging off the set I(T). It may be noted that such queries that are not in I(T) contain at least K initial characters of the first word thereby reducing the potential number of matching terms significantly. These terms may then be collected and analyzed for the matching of the remaining words in the term.

Figure 6:
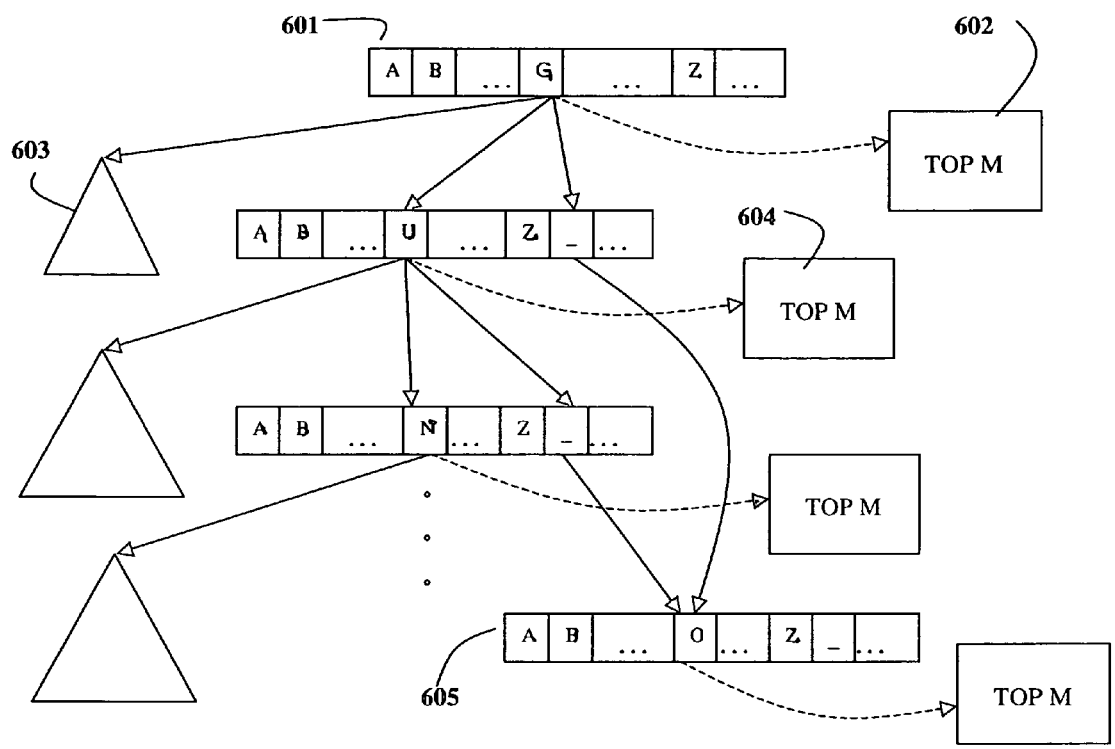
FIG. 6 illustrates an example of a data structure to enable dynamic search leveraging off pre-indexed substring prefixes in accordance with one or more embodiments of the invention.

FIG. 6 illustrates a data structure that enables searching using variable prefix strings. This exemplary illustration shows the case of K=2 and C=1 (although subsequent words in the term are not illustrated). The illustration uses a trie data structure 601 to index the prefix strings. Each character in the trie 604 points to a set of top M 602 records that contains the most popular terms that begin with the prefix corresponding to the path from the root to that character. The ordering could be governed, e.g., by popularity, temporal relevance, location relevance, and personal preference. Single word terms may be selectively given a boost in the ordering in order for it to be discovered quickly since it cannot leverage off the "K" factor or "C" factor. The TOP M records corresponding to every node in the trie may be placed in memory that enables quick access to them. The value of M may be determined by factors such as the display size of the devices from which search would be done and the available memory capacity of the server or client system where the search metadata is stored. Each character in the trie also points to a container 603 that holds all records following the TOP M. For the term "guns of navarone", two new prefix strings in addition to the previous term, are created for the case K=2, "g_ of navarone" and "gu_ of navarone". The prefix strings "g_" and "gu_" both point to node starting the next word "o" 605.

Figure 7:
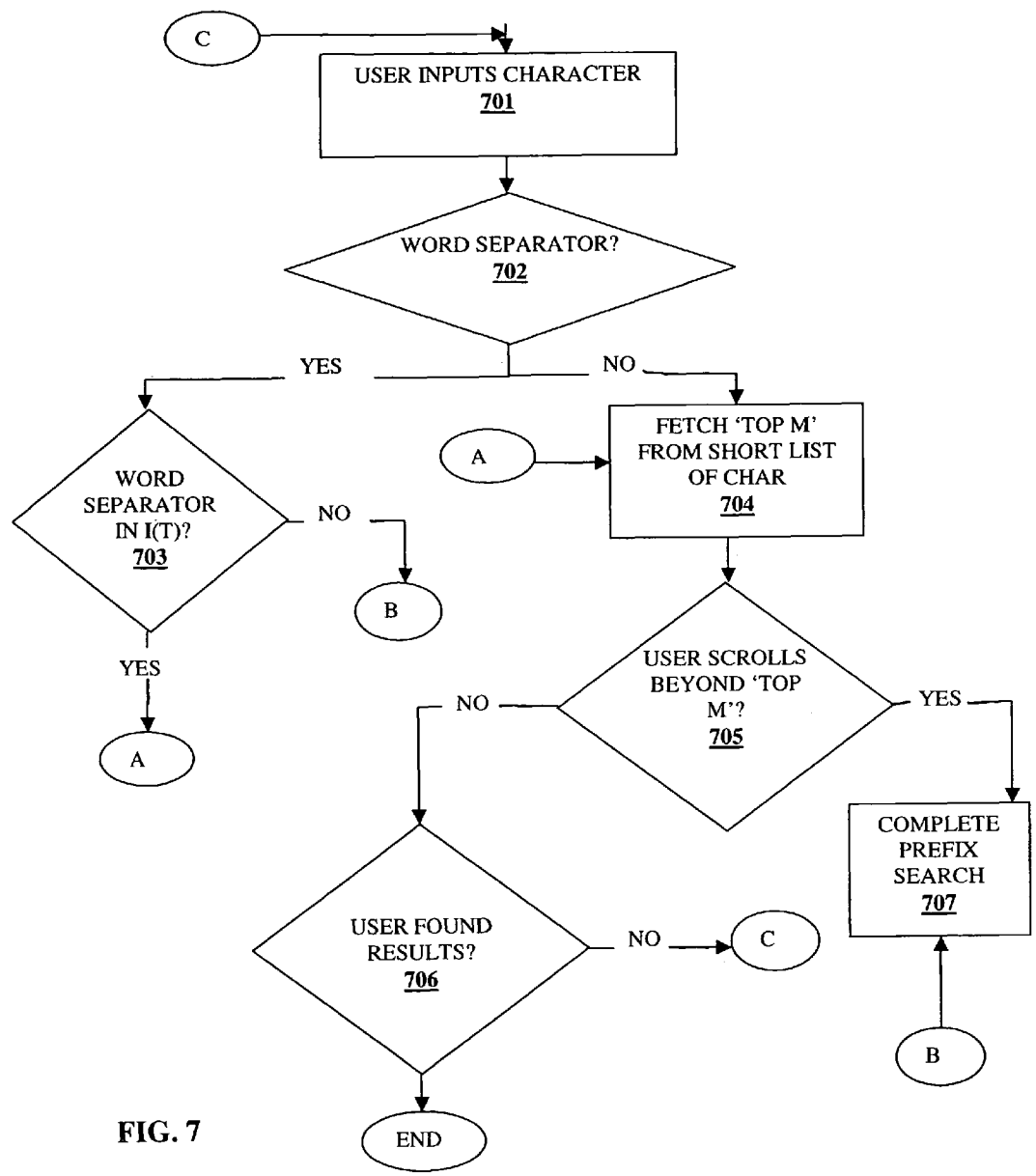
FIG. 7 illustrates internal steps of search as each character is input in accordance with one or more embodiments of the invention.

FIG. 7 illustrates a process of finding results using the variable prefix string scheme in accordance with one or more embodiments of the invention. When user inputs a character of a prefix string at 701, the system examines if it is a word separator at 702. If it is not a word separator, the system fetches the top M records at 704 for that character. If it is a word separator, system examines if the prefix with the word separator is in I(T) at 703. If it is in I(T), the system accesses the top M records for that node in the trie at 704. If the word separator is not in I(T), the system does a complete search at 707 for the records beginning with that prefix string. Also, after step 704, if user scrolls through the results list beyond top M results at 705, the system would perform a complete search at 707. If the user does not scroll beyond the top M results, and the user does not arrive at the result at 706, he can go back and enter another character at 701. So by having just a proper subset I(T) of the prefix strings precomputed, the system can leverage off the precomputed strings. For example, if user entered "gun_o" for the case K=2, C=1, the system would perform a complete search under strings beginning with gun and generate dynamically the top records that have the second word starting with 'o'. Accordingly, the dynamic search process rides on top of the information provided by the precomputed prefix strings.

Figures 8A, 8B:
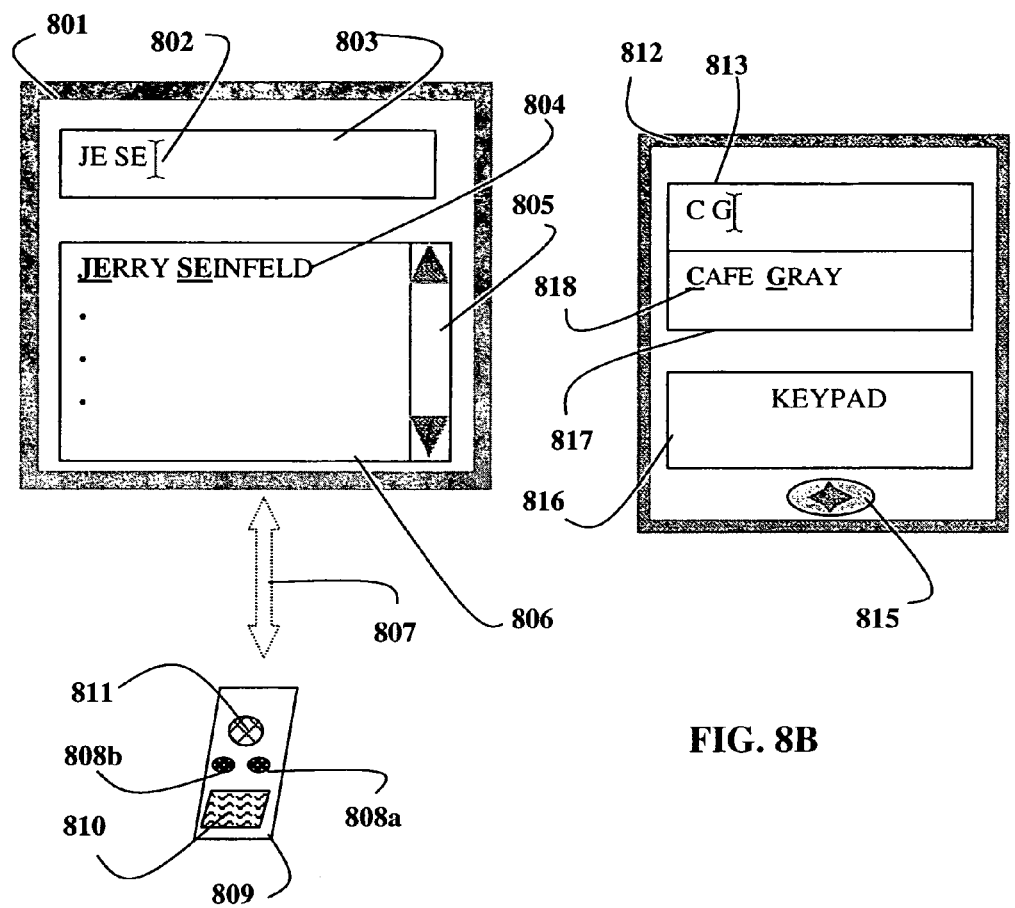
FIGS. 8A and 8B illustrate interface characteristics of two search devices in accordance with one or more embodiments of the invention.

FIGS. 8A and 8B illustrates two exemplary search devices in accordance with one or more further embodiments of the invention. In FIG. 8A, a television 801 is controlled by a remote control device 809 over a wireless connection 807. The device 809 has a keypad 810, a navigation interface 811, a 'next word' button 808a, and a 'previous' button 808b. A preferred interface layout for performing searches is illustrated on the television screen with a permanent text entry focus (which has only one text entry) and decoupled tab focus. This enables user to enter text at any time without having to explicitly switch focus to the text window 803. A results window 806 is displayed with a scroll control 805. The results window 806 can be navigated using the navigation interface 811 on the remote 809. As a user types in "JE SE" at 802, the results window content 804 is dynamically culled to show the results. The remote control 809 has a prominent and easily accessible 'next word' button 808a, that facilitates entry of a space character to delimit words. The 'next word' interface facilitates easy entry of multiple prefix strings. Additionally the remote also has the "previous word" button 808b to facilitate easy traversal to the end of the previous words. This can be used in the remote scenario where the user did not enter sufficient characters for the first 'm' prefixes of a term and has to go back to add more characters if the desired result is not reached.

The second device illustrated in FIG. 8B is a hand-held device (e.g., a phone) 812 that has a built-in keypad 816 and navigation interface 815. The display window 813 on this device is likely to be much smaller and hence hold fewer results in a results area 817. Scrolling may be cumbersome on these devices. Aggregation of words can be used wherever applicable to reduce bucket sizes and hence scrolling.

In accordance with one or more embodiments of the invention, the system provides visual cues to users to assist in educating the user on what would be a generally optimal prefix string entry. In the illustrated examples, the visual cues are in the form of underlined prefixes beneath each result 804, 818. The user may over time learn to enter a generally optimal prefix string input due to the visual cues. The optimal prefix string that can display a term within the display space of a device without scrolling can be determined in advance by the system taking into account the number of lines in the display and the relevance factor of the term.

In accordance with one or more embodiments of the invention, entity and term space complexity is considered in designing a search/disambiguating mechanism and operations, in addition to device characteristics themselves. In some cases, in order to apply one or more embodiments of this invention to a given entity/term space, it is useful to appropriately partition the space and have multiple distinct computing engines to serve requests. For example a movie search space could be broken down into smaller search spaces by categorizing them into genres. Similarly a phone book search space can be broken down by categorizing it into cities, and towns. The average size of the hash bucket would set a lower bound on the prefix size. Furthermore, the number of characters to be entered may have to be increased to keep the hash collision count within the tolerable limit of scrolling. For example, in a study done on the movie space, a random sampling of 150,000 English movie titles revealed that 99% of the search space can be covered by 6 characters with hash collisions below 10, while approximately 50% of the search space was covered by a 4 character scheme with a hash collision size below 10. It is interesting to note while the search space was only 150,000 items, it took 6 characters or 300 million buckets to contain the collisions within 10. A study of a restaurant namespace in Westchester, N.Y. with a listing of 1,500 restaurants showed that 98-99% of the restaurants were listed within a display list of top 5 restaurants with the entry of 4 characters, where 2 characters were taken from the first word and two from the next. A study of phonebook namespace for Connecticut State Govt. with 29,500 employees expanded to 58,000 to accommodate for unordered namespace revealed that for a bucket size of 10 and with 4 characters (first word 2 characters and 2 characters from the second word), 62% were listed in the top 10 names. When the number of characters entered increased to 6, 96.5% were listed within the top 10 names.

Methods of identifying content from reduced text input in accordance with various embodiments of the invention are preferably implemented in software, and accordingly one of the preferred implementations is as a set of instructions (program code) in a code module resident in the random access memory of a computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

Having described preferred embodiments of the present invention, it should be apparent that modifications can be made without departing from the spirit and scope of the invention.

Method claims set forth below having steps that are numbered or designated by letters should not be considered to be necessarily limited to the particular order in which the steps are recited.

The invention claimed is:

1. A method of incrementally identifying and selecting a television content item to be presented from a relatively large set of selectable television content items, the television content items being associated with descriptive terms that characterize the selectable television content items, the method comprising:

using an ordering criteria to rank and associate subsets of television content items with corresponding strings of one or more descriptor prefix strings, each descriptor prefix string being a variable length string containing a subset of the characters of the descriptive terms that characterize the selectable television content items, wherein each descriptor prefix string contains less than all characters of the descriptive terms;

subsequent to ranking and associating the television content items with strings of one or more descriptor prefix strings, receiving incremental text input entered by a user, the incremental text input including a first descriptor prefix of a word entered by the user for incrementally identifying at least one desired television content item of the relatively large set of television content items, wherein the first descriptor prefix contains less than all characters of the word the user is using to incrementally identify the at least one desired television content item;

selecting and presenting on a display device the subset of television content items that is associated with the first descriptor prefix string;

subsequent to receiving the first descriptor prefix, receiving subsequent incremental text input entered by the user, the subsequent incremental text input including a second descriptor prefix of a word entered by the user for incrementally identifying the at least one desired television content item and forming a string of prefixes including the first descriptor prefix and the second descriptor prefix in the order received, wherein the second descriptor prefix contains less than all characters of the word the user is using to incrementally identify the at least one desired television content item; and selecting and presenting on the display device the subset of television content items that is associated with the string of prefixes received.

2. The method of claim 1, wherein the first and second prefixes are in an ordered format.

3. The method of claim 1, wherein the first and second prefixes are in an unordered format.

4. The method of claim 1, wherein the first and second prefixes are separated by a word separator.

5. The method of claim 1, wherein the selected and presented subset of television content item comprises two or more television content items, and wherein the selected and presented subset of television content items are ordered for presentation in accordance with a given relevance function.

6. The method of claim 5, wherein the given relevance function comprises popularity of the television content items.

7. The method of claim 5, wherein the given relevance function comprises temporal relevance of the television content items.

8. The method of claim 5, wherein the given relevance function comprises location relevance of the television content items.

9. The method of claim 1, wherein the incremental text input specifies at least a portion of a title of the at least one desired television content item.

10. The method of claim 1, wherein the method is implemented in a server system remote from the user.

11. The method of claim 1, wherein the method is implemented in a device included in or proximate to a television set for displaying the subset of television content items.

12. The method of claim 1, further comprising determining the descriptive terms prior to receiving the incremental text input from the user.

13. The method of claim 12, wherein determining the descriptive terms comprises identifying a set of candidate terms comprising ordered or unordered words.

14. The method of claim 13, further comprising identifying the location of stop words in the descriptive terms.

15. The method of claim 12, wherein determining the descriptive terms comprises adding phonetically equivalent words to the descriptive terms.

16. The method of claim 12, wherein determining the descriptive terms comprises adding commonly misspelled words of words in the descriptive terms.

17. The method of claim 1, further comprising providing the user with visual cues to assist the viewer in entering generally optimal incremental text input for a search.

18. The method of claim 1, wherein the descriptive terms include at least one of title, cast, director, description, and keyword information relating to the television content item.

19. A system for incrementally identifying and selecting a television content item to be presented from a relatively large set of selectable television content items, the television content items being associated with descriptive terms that characterize the selectable television content items, the system comprising:
  a database in an electronically readable medium for storing the relatively large set of selectable television content items and associated descriptive terms that characterize the selectable television content items;
  a plurality of subsets of television content items, each subset being ranked and associated with corresponding strings of one or more descriptive prefix strings based on an ordering criteria, each descriptor prefix string being a variable length string containing a subset of the characters of the descriptive terms that characterize the selectable television content items, wherein each descriptor prefix string contains less than all characters of the descriptive terms; and
  program code on a computer-readable medium, which when executed on a computer system performs functions including:
    receiving incremental text input entered by a user, the incremental text input including a first descriptor prefix of a word entered by the user for incrementally identifying at least one desired television content item of the relatively large set of television content items, wherein the first descriptor prefix contains less than all characters of the word the user is using to incrementally identify the at least one desired television content item;
    selecting and presenting on a display device the subset of television content items that is associated with the first descriptor prefix string;
    subsequent to receiving the first descriptor prefix, receiving subsequent incremental text input entered by the user, the subsequent incremental text input including a second descriptor prefix of a word entered by the user for incrementally identifying the at least one desired television content item and forming a string of prefixes including the first descriptor prefix and the second descriptor prefix in the order received, wherein the second descriptor prefix contains less than all characters of the word the user is using to incrementally identify the at least one desired television content item; and
    selecting and presenting on the display device the subset of television content items that is associated with the string of prefixes received.

20. The system of claim 19, wherein the first and second prefixes are in an ordered format.

21. The system of claim 19, wherein the first and second prefixes are in an unordered format.

22. The system of claim 19, wherein the first and second prefixes are separated by a word separator.

23. The system of claim 19, wherein the selected and presented subset of television content item comprises two or more television content items, and wherein the selected and presented subset of television content items are ordered for presentation in accordance with a given relevance function.

24. The system of claim 23, wherein the given relevance function comprises popularity of the television content items.

25. The system of claim 23, wherein the given relevance function comprises temporal relevance of the television content items.

26. The system of claim 23, wherein the given relevance function comprises location relevance of the television content items.

27. The system of claim 19, wherein the incremental text input specifies at least a portion of a title of the at least one desired television content item.

28. The system of claim 19, wherein the computer system is a server system remote from the user.

29. The system of claim 19, wherein the computer system is a device included in or proximate to a television set for displaying the selected subset of television content items.

30. The system of claim 19, wherein the plurality of subsets of television content items is present in the system prior to receiving the incremental text input from the user.

31. The system of claim 19, wherein the descriptive terms are determined by identifying a set of candidate terms comprising ordered or unordered words.

32. The system of claim 19, wherein the descriptive terms are determined by identifying the location of stop words in said terms.

33. The system of claim 19, wherein the descriptive terms comprise phonetically equivalent words to the descriptive terms.

34. The system of claim 19, wherein the descriptive terms comprise commonly misspelled words of words in the descriptive terms.

35. The system of claim 19, wherein the program code when executed on the computer system further performs the function of providing the user with visual cues to assist the user in entering a generally optimal incremental text input for a search.

36. The system of claim 19, wherein the descriptive terms include at least one of title, cast, director, description, or keyword information relating to the television content item.

* * * * *